United States Patent [19]
Chen et al.

[11] Patent Number: 5,900,919
[45] Date of Patent: May 4, 1999

[54] EFFICIENT SHOT CHANGE DETECTION ON COMPRESSED VIDEO DATA

[75] Inventors: Shu-Chin Su Chen, Hsinchu; Cheng-Yao Ni, Pingtung; Tony C. T. Kuo, Hsinchu; Y. B. Lin, Chung-Hua; Arbee L. P. Chen, Hsinchu, all of Taiwan

[73] Assignee: Industrial Technology Research Institute, Hsinchu, Taiwan

[21] Appl. No.: 08/758,784

[22] Filed: Dec. 2, 1996

[30] Foreign Application Priority Data

Aug. 8, 1996 [TW] Taiwan ................................. 85109708

[51] Int. Cl.$^6$ ...................................................... H04N 7/24
[52] U.S. Cl. ............................................. 348/700; 348/409
[58] Field of Search ...................................... 348/384, 390, 348/222, 402, 407, 409–413, 415, 416, 564, 699, 700; 345/302; 382/232, 236, 238; H04N 7/130, 7/137

[56] References Cited

U.S. PATENT DOCUMENTS

| | | | |
|---|---|---|---|
| 4,890,160 | 12/1989 | Thomas | 348/699 |
| 5,179,449 | 1/1993 | Doi | 358/311 |
| 5,212,547 | 5/1993 | Otsuki | 358/105 |
| 5,262,856 | 11/1993 | Lippman et al. | 348/416 |
| 5,327,232 | 7/1994 | Kim | 388/412 |
| 5,485,611 | 1/1996 | Astle | 348/564 |
| 5,488,425 | 1/1996 | Grimes | 348/559 |
| 5,606,655 | 2/1997 | Arman et al. | 345/302 |
| 5,635,982 | 6/1997 | Zhang et al. | 348/222 |
| 5,691,775 | 11/1997 | Astle | 348/416 |
| 5,734,419 | 3/1998 | Botsford, III et al. | 348/700 |

OTHER PUBLICATIONS

K. Otsuji, *Projection Detecting Filter For Video Cut Detection*, ACM Multimedia, pp. 251–257, Jun. 1993.

R. Zabih, *A Feature–Based Algorithm for Detecting and Classifying Scene Breaks*, ACM Multimedia '95, pp. 189–200, (1995).

D. Swanberg, *Knowledge Guided Parsing in Video Databases*, SPIE, vol. 1908 (1993). pp. 13–24.

F. Arman, *Feature Management For Large Video Databases*, SPIE, vol. 1908 (1993), pp. 2–12.

*Primary Examiner*—Richard Lee
*Attorney, Agent, or Firm*—Proskauer Rose LLP

[57] ABSTRACT

A mask matching approach to detect shot changes in MPEG coded video uses reference ratio variances of macroblocks between MPEG coded frames. A function is designed to quantize the results into shot change probability values. Moreover, a conversion function modifies this probability computation to minimize misdetection and loss of detection under unusual image pattern situations. A shot change probability threshold is defined for the video to be examined. When a frame's modified shot change probability exceeds this threshold, the frame is considered to contain a shot change. With this approach, processing time is reduced by evaluating MPEG coded data directly, rather than the raw video.

10 Claims, 2 Drawing Sheets

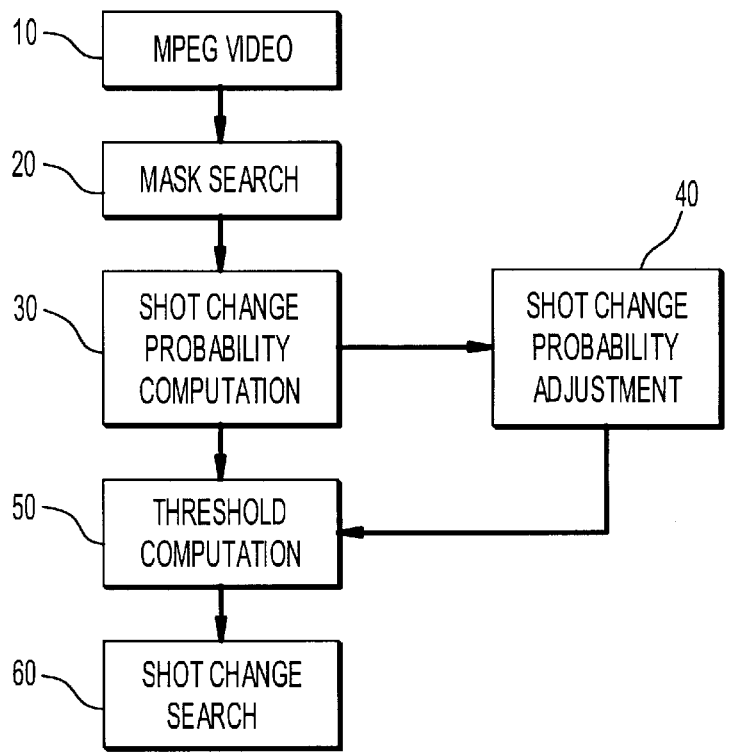

EFFICIENT SHOT CHANGE DETECTION ON COMPRESSED VIDEO DATA

FIELD OF THE INVENTION

The present invention relates to a method and apparatus for searching video data. More specifically, the present invention relates to a method and apparatus for detecting shot changes in compressed video data.

BACKGROUND OF THE INVENTION

The medium of digital video communication is widely used in many applications. Due to the rich information content of video data, queries can be specified not only by video titles, video descriptions, and alpha-numeric attributes of video data, but also by the video contents. Therefore, video index construction for supporting powerful query capabilities is an important research issue for video database systems.

Video segmentation is a fundamental step toward video index construction. Video sequences may be segmented according to so-called "shot changes", which are often used for video browsing. A "shot" is made up of a sequence of video frames which represents a continuous action in time and space. Therefore, the contents of the frames belonging to the same shot are similar. A shot change is defined as a discontinuity between two shots. The similarity (or dissimilarity) measurement of continuous frames may therefore be used for shot change detection.

In the prior art, many varied approaches have been explored in the development of indexing techniques. U.S. Pat. No. 5,212,547, dated May 18, 1993, entitled "Image Processing Device and Method for Sensing Moving Objects and Rangefinder Employing the Same", teaches finding objects in motion in a frame. The video data of a frame is subtracted from the average value of the video data of the frame. This technique does not involve shot change detection, however.

In U.S. Pat. No. 5,327,232, dated Jul. 5, 1994, entitled "Method and Apparatus for Detecting Motion Vectors", the objective is to detect the motion vector of the content of a frame, using an image block matching method. Again, this technique does not utilize shot change detection.

In U.S. Pat. No. 5,488,425, dated Jan. 30, 1996, entitled "Apparatus for Storing Video Information by Recognizing Video Frames", the objective is to select one frame and detect similar frames subsequent to it. Shot change detection is not an objective of this invention.

In U.S. Pat. No. 5,179,449, dated Jan. 12, 1993, entitled "Scene Boundary Detecting Apparatus", the object to be processed is the original video data, rather than the compressed video image frames. As a result, the speed of processing is relatively slow.

In the paper entitled "A Feature-Based Algorithm for Detecting and Classifying Scene Breaks", by Ramin Zabih, et al.[ACMMM95], the subject thesis detects an occurrence of a shot change by observing changes in the positions of the lines in adjacent frames. Thus, the major feature of this method is the use of image analysis, whereby lines in a frame are detected for determination of a shot change. Since the data being processed is the original video data, the speed of processing is relatively slow.

In the paper entitled "Feature Management for Large Video Databases", by Farshid Arman, et al.[SPIE93], the subject thesis deals with DCT-based compressed video data where the DCT multiple parameters are used to determine a shot change. In consecutive frames, an inner product is obtained through calculation of the DCT parameters of the block in the same position. The greater the difference in the frames, the larger the inner product will be. This method is capable of determining a shot change in a timely manner, since it does not analyze the original image data of the frame. However, when the inner product falls within a gray area, so that it is difficult to determine whether or not there is a shot change, the frames must be decompressed and analyzed using original image data. Thus, the processing speed is compromised.

In the paper entitled "Projection Detecting Filter for Video Cut Detection", by Kiyotaka Otsuji and Y. Tonomura [ACMMM93], the subject thesis proposes a process of filtering, whereby the frame variations that are not caused by a shot change are reduced to a minimum, and the determination of the variations of a shot change in the frames is simplified. However, this thesis does not consider the use of compressed video data.

In the paper entitled "Knowledge Guided Parsing in Video Databases", by Deborah Swanberg et al. [SPIE93], the subject thesis proposes the use of a color histogram difference method to determine a shot change. The distribution of the content of a frame is predicted according to different kinds of video data, so as to locate the position of a shot change with accuracy, and to decide the classification of the shot at the same time. The disadvantage of this method is that a knowledge base of the video data must be defined on a case-by-case basis.

Therefore, it is an object of the present invention to overcome the disadvantages of the prior art.

SUMMARY OF THE INVENTION

This and other objects are achieved by the present invention. In accordance with an illustrative embodiment of the present invention, a system and method are provided for detecting shot changes in MPEG coded video. The system has a processor and a memory, as well as input and output devices. The processor illustratively executes the following steps in detecting a shot change:

(a) defining a shot change mask cluster based on the IBP-ratio of the compressed MPEG coded video data, (b) calculating a shot change probability function P for each frame of the MPEG video data, where each P and B frame is encoded with references to adjacent frames, and where the I frames are encoded independently, (c) determining a threshold value T for the shot change probability function P, (d) comparing the shot change probability function P for each frame with the threshold value T, and (e) detecting a shot change at any of the frames when that frame's shot change probability function P exceeds the threshold value T.

The shot change mask cluster of step (a), above, is made up of a sequence of I, P, and B types of frame masks, with low reference characteristics between adjacent frames within the frame mask. The processor illustratively stores the mask cluster in the memory. Note that the memory can also store the probability and threshold data and equations.

An illustrative embodiment of the present invention is more fully described below in conjunction with the following drawings.

BRIEF DESCRIPTION OF THE DRAWINGS

FIG. 3 illustrates an example video sequence.

FIG. 4 illustrates an example for computing shot change probability.

FIG. 5 is a flowchart which schematically illustrates a process according to an embodiment of the present invention.

DETAILED DESCRIPTION OF THE INVENTION

Figure 1:
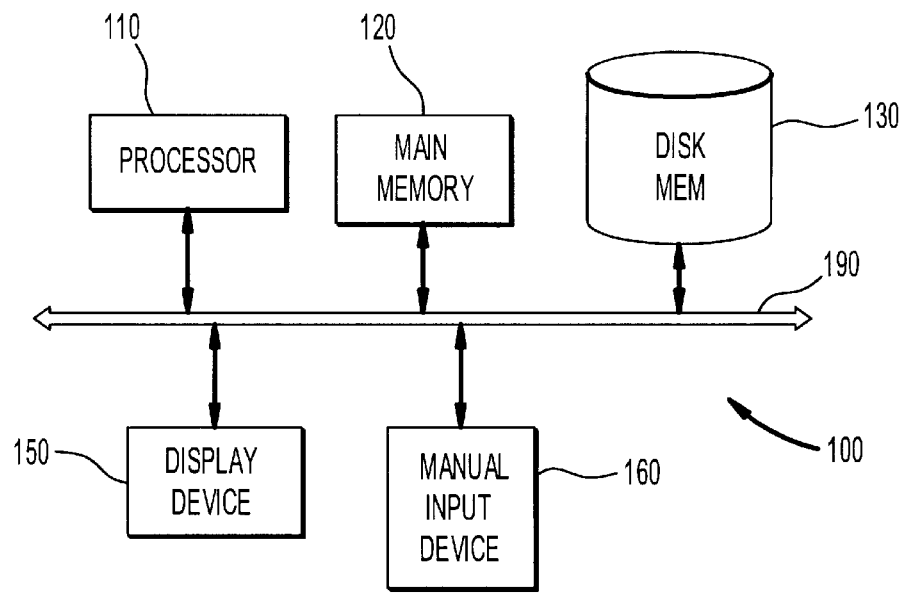
FIG. 1 shows a system according to an embodiment of the present invention.

According to one embodiment of the present invention, a system 100, as shown in FIG. 1, is used to analyze MPEG (e.g., ISO\IEC 11172-2 1993 Information Technology—Coding of Moving Pictures and Associated Audio for Digital Storage Media at up to about 1.5 Mbit/s—Part 2: Video or "MPEG-1" and ISO\IEC 13818-2 Information Technology—Generic Coding of Moving Pictures and Associated Audio Information: Video, Nov. 11, 1994 or "MPEG-2") compressed (encoded) video data. As shown, the apparatus 100 has a processor 110, such as an Intel™ Pentium™ microprocessor, or a Motorola™ PowerPC 603™ microprocessor. The processor 110 executes suitable software for carrying out the functions described below. The apparatus 100 also has a main memory 120 and a disk memory 130 for storing the video database and queries executed thereon. The processor 110, main memory 120, and disk memory 130 are connected to a bus 190, which transfers data, e.g., program instruction or video information, between the devices connected thereto. A display device 150, such as a liquid crystal display (LCD), or cathode ray tube (CRT) monitor, is provided, which may be connected to the bus 190 via a graphics adapter (not shown). Illustratively, the display device 150 is capable of displaying motion picture video thereon, for example, motion picture video of a database stored by the apparatus 100, or frames of a video query. A manual input device 160, such as a keyboard and mouse/pointing device, may also be provided, which is also connected to the bus 190. The manual input device can receive keypunch/pointing input from a user, for example, to generate queries as described below.

The MPEG standard for video compression is used in many applications where a high level of video compression is desired. While the MPEG standard applies to field pictures as well as to frame pictures, only the MPEG frame structure will be described herein in reference to the inventive shot change detection method. Because MPEG video is highly compressed, shot change detection algorithms which perform on raw (uncompressed) video are not optimal for MPEG coded video, since additional processing is required for decompressing the MPEG compressed video into raw video. Therefore, it is more efficient to detect shot changes on MPEG compressed video directly.

The MPEG coding algorithm uses DCT (Discrete Cosine Transform) to compress raw video data. Additionally, MPEG uses block-based motion compensation to reduce temporal redundancy. By means of motion compensation, codes of similar blocks can be reduced by referencing them to the image contents of adjacent frames. The more blocks a frame references, the more similar the adjacent frames are. Therefore, by analyzing the references among coded frames, their similarities (or dissimilarities) can be determined.

In the MPEG coding structure, a frame is divided into macroblocks. Each macroblock is a 16×16 image in the form of a basic coding unit. A macroblock can be coded by DCT, or by references to its adjacent frames when it matches the similar image patterns of these adjacent frames. A macroblock coded by DCT is called an intra-coded macroblock. A macroblock which references to similar image patterns is called either forward-prediction coded, backward-prediction coded, or bidirectional-prediction coded, when it references to the image patterns of the preceding frame, subsequent frame, or both preceding and subsequent frames, respectively. A reference to the preceding frame is named forward reference, and to the subsequent frame, backward reference.

In accordance with the MPEG referencing patterns of macroblocks, there are three types of frames; namely, I frame, P frame and B frame. All macroblocks in an I frame must be intra-coded. That is, the I frame is independently coded, and can be decompressed without referencing to other frames. Macroblocks of the P frame may have forward references to its preceding I or P frame. That is, a P macroblock is a forward-prediction coded macroblock when a similar image pattern is found in the preceding I or P frame. Otherwise, it is intra-coded when a similar image pattern can not be found in the preceding I or P frame. A B frame may have references to its adjacent I or P frames. The macroblock in a B frame can be a bidirectional-prediction coded, forward-prediction coded, or backward-prediction coded macroblock.

Figure 2:
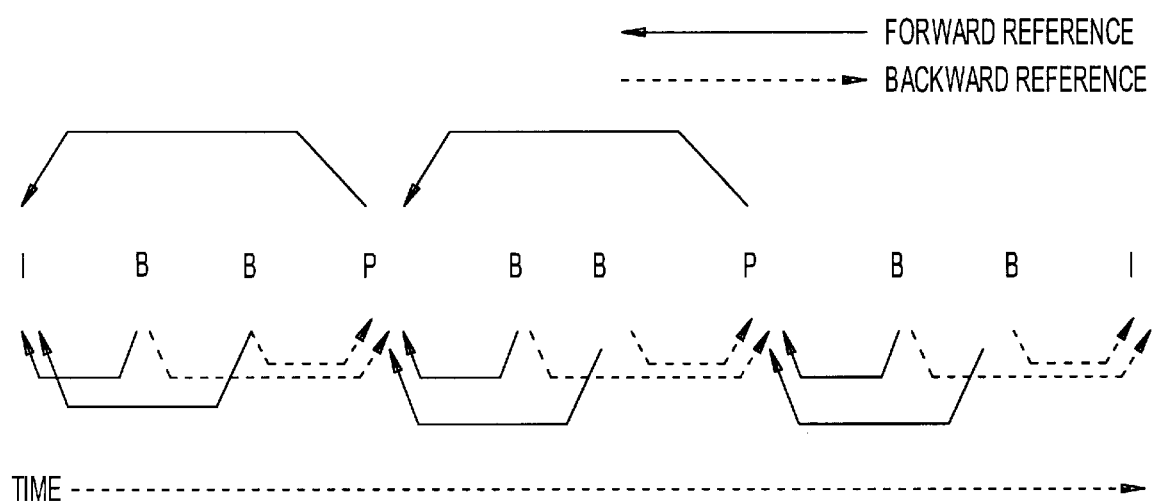
FIG. 2 illustrates a typical MPEG frame sequence.

In MPEG coded video, the number and sequence of I, P, and B frames are predetermined. In general, a number of P and B frames are situated between two I frames, and a number of B frames may be between two P frames, or between an I and a P frame. FIG. 2 illustrates a typical structure of MPEG coded frames. In FIG. 2, the ratio of the numbers of I, P, and B frames (called the IPB-ratio) is 1:2:6. That is, an I frame is followed by two P frames and six B frames in the sequence shown.

For the P and B frames, macroblocks may reference to adjacent frames. The number of macroblocks for each type of reference may be computed as a reference ratio to measure the similarity between adjacent frames. Two types of reference ratios (RR's) are defined as follows:

$$\text{Forward reference ratio } (FRR) = R_f/N \quad (1)$$

where $R_f$ is the number of forward-prediction coded macroblocks in a frame, and N is the total number of macroblocks in the frame.

$$\text{Backward reference ratio } (BRR) = R_b/N, \quad (2)$$

where $R_b$ is the number of backward-prediction coded macroblocks in a frame, and N is the total number of macroblocks in the frame.

The range of an FRR or a BRR is between 0 and 1. A P frame may have an FRR. A B frame may have both an FRR and a BRR. When a P or B frame FRR is high, it indicates that the frame is similar to its preceding frame. When a P or B frame BRR is high, it indicates that the frame is similar to its subsequent frame. An RR is regarded as high when it exceeds a given threshold value. An I frame has neither an FRR nor a BRR. Therefore, to measure the similarity between an I frame and its adjacent frames, the FRR's and BRR's of these adjacent frames must be evaluated.

In a video sequence, the contents of continuous frames are similar when there is no shot change. Therefore, the reference ratios of these frames are high. When a shot change occurs, however, the contents of subsequent frames are dissimilar to the preceding frames. Therefore, the reference ratios of these frames are low.

In the present invention, shot changes are detected by evaluating the reference ratios of MPEG coded frames. Therefore, only the information regarding reference ratios has to be computed. This reduces processing time, since there is no need to decompress each coded frame. For example, in a video sequence containing 10,000 continuous frames, each frame is a 256×256 image. That is, a frame contains 256 macroblocks. To compute the reference ratio of a frame, only 256 add operations are needed, as compared with 65536 (i.e., on the order of $10^5$) add operations for color histogram or $10^3$ multiply operations for DCT-based approaches.

A shot change may occur in any type of frame. When a shot change occurs at an I frame, the B frames between this I frame and the preceding I or P frames must be evaluated, since I frames are encoded independently of other frames. The preceding B frames use this subsequent I frame as a backward reference for encoding. Because the preceding B frames are now dissimilar to the image patterns of the subsequent I frame, the BRR's of the B frames must be low. The FRR's of these B frames are not considered, since they are not relevant to the subsequent I frame. The B frames between this I frame and a subsequent P frame need not be considered either, since they are also not relevant to this shot change detection method.

When a shot change occurs at a P frame, the B frames between this P frame and a preceding I or P frame behave the same as in the previous case of an I frame shot change. Unlike the I frame, however, the P frame does have forward references. Since this P frame is the shot change frame, its forward reference must be low, since it is now dissimilar to the image patterns of the preceding I or P frames.

When a shot change occurs at a B frame, this B frame will have a low FRR. If there are B frames between the shot change B frame and a preceding I or P frame, the BRR's of the preceding B frames must be low. If there are B frames between the shot change B frame and a subsequent I or P frame, the FRR's of the subsequent B frames must be low. Also, if the first non-B frame following the shot change B frame is a P frame, the FRR of this subsequent P frame must be low.

To illustrate this evaluation technique, an MPEG video sequence with an IPB-ratio of 1:3:8 is shown in FIG. 3. If a shot change occurs at I frame 13, for example, the B frames 11 and 12 will have low BRR's. If a shot change occurs at P frame 10, the BRR's of B frames 8 and 9 are low, as is the FRR of P frame 10. The situation is different, however, when a shot change occurs at B frame 5 as compared to B frame 6. If B frame 5 is the shot change frame, P frame 7 and B frames 5 and 6 will have low FRR's. If a shot change occurs at B frame 6, the BRR of B frame 5 will be low, and the FRR's of P frame 7 and B frame 6 will be low as well.

Therefore, it is clear from the preceding analysis that a shot change can be detected at a frame by examining and evaluating the FRR's and/or BRR's of that frame and its adjacent frames. To achieve this in the present invention, a mask matching approach is used to detect shot changes by examining the MPEG coded video frame by frame. For each MPEG video film, a set of shot change masks (or mask cluster) is defined in accordance with the IPB-ratio of the video sequence. Since there are I, P, and B frames, the types of masks are I_frame, P_frame, and B_frame, respectively. The different types of frames must be matched with corresponding types of masks. The RR's of the frames are then evaluated and compared with the RR patterns specified in the corresponding shot change masks. When a frame is matched with its associated mask, it is detected as a shot change frame.

As defined herein, a shot change mask denotes the qualification for detecting a shot change. The mask consists of two parts:

(1) the type of mask (I, P, or B)
(2) a sequence of mask frames

A mask frame $M_1$ can be denoted as follows:

$M_1$=FR, where F ∈ {I, P, B}, and R ∈ {f, b}

F denotes the frame type (I or P or B), and R denotes the reference ratio (RR). When R=f, the forward reference ratio of the frame is low, while when R=b, the backward reference ratio of the frame is low. High RR's are not used to detect the occurrences of shot changes.

A mask M can then be denoted as:

M={type; ($M_1$, $M_2$, ... $M_n$)}, where type ∈ {I, P, B}, and $M_i$ are mask frames.

For example, if the IPB-ratio of an MPEG film is 1:2:6, its shot change mask cluster is configured as follows:

$M_1$={I; (Bb, Bb, @I)};
$M_2$={P; (Bb, Bb, @Pf)};
$M_3$={B; (@Bf, Bf, Pf) or (@Bf, Bf, I)};
$M_4$={B; (Bb, @Bf, Pf) or (Bb, @Bf, I)};

To denote the sequence of the frames, the mask frame beginning with an '@' indicates the current frame. Mask $M_1$ is for the I frame and mask $M_2$ is for the P frame. Because of the IPB-ratio 1:2:6, the B frame may have two different situations; that is, a B frame may be preceded by an I or a P frame and followed by a B frame, or it may be preceded by a B frame and followed by an I or a P frame. Therefore, there are two masks, $M_3$ and $M_4$, for the B frame. The $M_3$ mask indicates that the current B frame should have a low FRR, its subsequent B frame should have a low FRR, and its subsequent P frame should have a low FRR. If the subsequent frame is an I frame, it can be ignored. Similarly, the $M_4$ mask indicates that the current B frame should have a low FRR, its preceding B frame should have a low BRR, and its subsequent P frame should have a low FRR.

Referring again to FIG. 3, if I frame 13 is to be examined, the $M_1$ mask is applied. By checking the mask frames of $M_1$, the preceding two B frames should have low BRRs when I frame 13 has a shot change. That is, B frame 11 and 12 have low BRR's.

In the present invention, the concept of mask matching depends on the determination of whether a frame has a low reference ratio. In order to establish the meaning of "low", the reference ratio should be compared with a predefined threshold. Different types of videos may have different thresholds.

To establish a threshold, the results of mask matching are first quantized to a value which indicates the shot change probability. The shot change probability function P is defined as follows:

$$P = 1 - \frac{RR_{f_1}^2 + RR_{f_2}^2 + \ldots + RR_{f_n}^2}{RR_{f_1} + RR_{f_2} + \ldots + RR_{f_n}} \quad (3)$$

where $f_1, f_2, \ldots f_n,$ ∈ the mask frames of the current frame, and $RR_{f_i}$ is the corresponding reference ratio of mask frame $f_i$. If ∀ $RR_{f_i}$=0, where $1 \leq i \leq n$, then P is set to 1.

The shot change probability ranges from 0 to 1. The larger the value, the more likely a shot change will occur at the frame being evaluated. The second term in Equation (3) is the weighted sum of the corresponding RR's of the mask frames. Thus, if one RR is much larger than the others, the result of the weighted sum will approach the larger RR. This emphasizes the effect of larger RR's on the probability function P. Therefore, the shot change probability will be low if there is a mask frame with a high RR.

For example, consider the video stream as shown in FIG. 4. The mask used to detect P frame 6 is {P; (Bb, Bb, @Pf)}.

If the BRR of B frame 4, the BRR of B frame 5, and the FRR of P frame 6 are all equal to 0.2, the probability that a shot change will occur at P frame 6 is computed as (1−0.2)= 0.8. This indicates that P frame 6 is a highly probable shot change frame.

Referring again to FIG. 4, if the BRR of B frame 4 is 0.8, the BRR of B frame 5 is 0.2 and the FRR of P frame 6 is 0.2. The shot change probability can be computed as (1− 0.6)= 0.4 by applying Equation (3). In this case, the probability of a shot change occurring at P frame 6 is low.

When all the shot change probabilities have been computed, a probability threshold may be defined for implementing the inventive mask matching method. That is, if the shot change probability of a frame is greater than the probability threshold, the frame is regarded as a shot change frame.

An illustrative shot change probability threshold T is defined herein as:

$$T=(F+F')/2, \quad (4)$$

where F is the average probability of the 97.5% of all frames having the lowest probabilities, and F' is the average probability of the 2.5% of all frames having the highest probabilities. The choice of 97.5% and 2.5% is based on the assumption that there is approximately one shot change for every 40 frames, on average. These two percentages may be adjusted for different types of videos. If both F and F' are less than 0.5, the shot change probability threshold T is set at 0.5.

The above described mask matching method has been found to work very well for most video applications. There are special situations, however, which may cause misdetections or loss of detections, as noted below:

(1) A sudden intensity change, as might be caused by an explosion, causes the frame similarities to be low. These problems are also encountered in other detection approaches.

(2) The contents between successive shots are very similar. Since similarity measurement approaches compare frame image contents to detect a shot change, the highly similar contents, such as a series of very dark frames, may cause loss of detections. One way to reduce this effect is to dynamically adjust the probability threshold.

(3) A special IPB-ratio format, such as two consecutive I frames, with a shot change at the second I frame, will cause a loss of detection.

(4) A large object motion or sudden movement of the video camera, which causes the contents to change quickly may cause a misdetection to occur.

In order to reduce the number of misdetections caused by the special situations described above, a conversion function is used to adjust the shot change probabilities of Equation (3). This function is defined herein as follows:

$$F(P_i) = \begin{cases} P_i - \text{MIN}(P_k), & \text{if } P_i = \text{MAX}(P_k) \\ 0, & \text{if } P_i \neq \text{MAX}(P_k) \end{cases} \quad (5)$$

where
$i - j \leq k \leq i + j$

The modified shot change probability function $F(P_i)$ from Equation (5) reduces the effects of fast motion phenomena. Moreover, by adjusting the value of j, the problem of two or more shot changes in a short period of time can be avoided.

The modified shot change probability function $F(P_i)$ is used in the same manner as described above for the shot change probability function (P). That is, if the modified shot change probability function $F(P_i)$ of a frame is greater than the probability threshold T, the frame is regarded as a shot change frame.

The inventive method disclosed herein is depicted in flow chart form in FIG. 5. Block 10 represents the compressed MPEG video being inputted to the inventive system (illustratively, system 100 in FIG. 1) for examination. In Block 20, the system detects the IPB-ratio of the MPEG input, and forms the shot change mask cluster appropriate to this ratio. In Block 30, the shot change probability for each frame is calculated, according to Equation (3). Block 40 represents the shot change probability adjustment in accordance with Equation (5). In Block 50, the shot change probability threshold is computed in accordance with Equation (4). Finally, in Block 60, the frames are examined with respect to their associated masks. If a frame's modified shot change probability is greater than its shot change probability threshold value, the frame is considered to contain a shot change.

In short, an efficient mask matching method is disclosed which automatically detects shot changes in MPEG compressed video data. Moreover, the disclosed method reduces processing time by directly evaluating MPEG coded data, rather than the original raw, or decompressed video data. The improved efficiency provides greater convenience of data searching for the user, and enhances the friendliness of an application system.

The above described embodiments of the invention are intended to be illustrative only. Numerous alternative embodiments may be devised by those skilled in the art without departing from the spirit and scope of the following claims.

The invention claimed is:

1. A method for detecting shot changes in compressed MPEG coded video data having I, P, and B frames, with an IPB ratio corresponding to the numbers of I, P, and B frames, respectively, comprising the steps of:

(a) defining a qualifying set of shot change masks in accordance with said IPB ratio of said compressed MPEG coded video data, said qualifying set of shot change masks comprising a sequence of I, P, and B types of frame masks, each of said I, P, and B types of frame masks having low reference ratio characteristics between adjacent frames within each I, P, and B type of frame mask, (b) calculating a shot change probability function P for each I, P, and B frame of said video data, based on said reference ratio of characteristics shot change frame masks, wherein each said P and B frame is encoded with references to adjacent frames, and wherein said I frames are encoded independently, (c) determining a threshold value T for said shot change probability function P, (d) comparing said shot change probability function P for each said I, P, and B frame of said video data with said threshold value T, and (e) detecting a shot change at any of said I, P, and B frames of said video data when said shot change probability function P of said I, P, or B frame exceeds said threshold value T.

2. The method of claim 1 wherein step (b) calculates said shot change probability function P for each said I, P, and B frame in accordance with the following equation:

$$P = 1 - \frac{RR_{f_1}^2 + RR_{f_2}^2 + \ldots + RR_{f_n}^2}{RR_{f_1} + RR_{f_2} + \ldots + RR_{f_n}}$$

where $f_1, f_2, \ldots F_n, \in$ said frame masks, and $RR_{fi}$ is the corresponding reference ratio of a frame mask $f_i$.

3. The method of claim 1 wherein step (c) determines said threshold value T for said shot change probability function P in accordance with the following equation:

$$T = \frac{F + F'}{2}$$

where F is the average probability of 97.5% of all said frames having lowest probabilities, and F' is the average probability of 2.5% of all said frames having highest probabilities.

4. The method of claim 2 wherein step (b) further comprises an adjustment to said shot change probability function P for each said I, P, and B frame in accordance with the following conversion function:

$$F(P_i) = \begin{cases} P_i - \text{MIN}(P_k), & \text{if } P_i = \text{MAX}(P_k) \\ 0, & \text{if } P_i \neq \text{MAX}(P_k) \end{cases}$$

where
$i - j \leq k \leq i + j$ where i is the frame number of said I, P, and B frame whose shot change probability is currently being computed, where j is a predetermined value which represents a minimum distance between two successive shot changes, and where k is determined by said values of i and j.

5. A method for detecting shot changes in compressed MPEG coded video data having I, P, and B frames, with an IPB ratio corresponding to the numbers of I, P, and B frames, respectively, comprising the steps of:

(a) defining a shot change mask cluster in accordance with said IPB ratio of said compressed MPEG coded video data, wherein said shot change mask cluster comprises a sequence of I, P, and B types of frame masks, each of said I, P, and B types of frame masks having low reference ratio characteristics between adjacent frames within each I, P, and B type of frame mask, (b) comparing said shot change mask cluster with each said I, P, and B frame of video data to find a match between said I, P, and B frame and its corresponding type of frame mask within said shot change mask cluster, and (c) detecting a shot change at any of said I, P, and B frames of said video data when one of said shot change mask cluster frame masks matches one of a corresponding type of said I, P, and B frames.

6. A system for detecting shot changes in compressed MPEG coded video data having I, P, and B frames, with an IPB ratio corresponding to the numbers of I, P, and B frames, respectively, comprising:

(a) an input device for receiving MPEG coded data,
(b) a processor for operating on said received data,
(c) a memory for storing data operated on by said processor,
(d) an output device for displaying results from said processor,
(e) said processor for defining a shot change mask cluster based on said IPB ratio of said compressed MPEG coded video data,
(f) said processor for calculating a shot change probability function P for each frame of said video data, wherein each said P and B frame is encoded with references to adjacent frames, and wherein said I frames are encoded independently,
(g) said processor for determining a threshold value T for said shot change probability function P,
(h) said processor for comparing said shot change probability function P for each said frame with said threshold value T, and
(i) said processor for detecting a shot change at any of said frames when said shot change probability function P of said frame exceeds said threshold value T, wherein said shot change mask cluster comprises a sequence of I, P, and B types of frame masks, each of said I, P, and B types of frame masks having low reference ratio characteristics between adjacent frames within said I, P, and B types of frame masks.

7. The system of claim 6 wherein step (b) calculates said shot change probability function P for each I, P, and B frame in accordance with the following equation:

$$P = 1 - \frac{RR_{f_1}^2 + RR_{f_2}^2 + \ldots + RR_{f_n}^2}{RR_{f_1} + RR_{f_2} + \ldots + RR_{f_n}}$$

where $f_1, f_2, \ldots f_n, \in$ said frame masks, and $RR_{fi}$ is the corresponding reference ratio of a frame mask $f_i$.

8. The system of claim 6 wherein step (c) determines said threshold value T for said shot change probability function P in accordance with the following equation:

$$T = \frac{F + F'}{2}$$

where F is the average probability of 97.5% of all said frames having lowest probabilities, and F' is the average probability of 2.5% of all said frames having highest probabilities.

9. The system of claim 7 wherein step (b) further comprises an adjustment to said shot change probability function P for each said I, P, and B frame in accordance with the following conversion function:

$$F(P_i) = \begin{cases} P_i - \text{MIN}(P_k), & \text{if } P_i = \text{MAX}(P_k) \\ 0, & \text{if } P_i \neq \text{MAX}(P_k) \end{cases}$$

where
$i - j \leq k \leq i + j$ where i is the frame number of said I, P, and B frame whose shot change probability is currently being computed, where j is a predetermined value which represents a minimum distance between two successive shot changes, and where k is determined by said values of i and j.

10. A system for detecting shot changes in compressed MPEG coded video data having I, P, and B frames, with an IPB ratio corresponding to the numbers of I, P, and B frames, respectively, comprising:

(a) a processor for defining a shot change mask cluster based on said IPB ratio of said compressed MPEG coded video data, wherein said shot change mask cluster comprises a sequence of I, P, and B types of frame masks, each of said I, P, and B types of frame masks having low reference ratio characteristics between adjacent frames within said types of I, P, and B frame masks, (b) said processor for comparing said shot change mask cluster with each said I, P, and B frame to find a match between said I, P, and B frame and its corresponding type of frame mask within said shot change mask cluster, and (c) said processor for detecting a shot change at any of said I, P, and B frames when one of said shot change mask cluster frame masks matches one of a corresponding type of said I, P, and B frames.

* * * * *